United States Patent
Liu et al.

(10) Patent No.: US 9,600,898 B2
(45) Date of Patent: Mar. 21, 2017

(54) METHOD AND APPARATUS FOR SEPARATING FOREGROUND IMAGE, AND COMPUTER-READABLE RECORDING MEDIUM

(71) Applicants: Liyan Liu, Beijing (CN); Ying Zhao, Beijing (CN)

(72) Inventors: Liyan Liu, Beijing (CN); Ying Zhao, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/918,680

(22) Filed: Oct. 21, 2015

(65) Prior Publication Data
US 2016/0117832 A1    Apr. 28, 2016

(30) Foreign Application Priority Data
Oct. 23, 2014  (CN) .......................... 2014 1 0573559

(51) Int. Cl.
 *G06K 9/34* (2006.01)
 *G06T 7/20* (2006.01)
 *G06T 7/00* (2006.01)

(52) U.S. Cl.
 CPC .......... *G06T 7/2006* (2013.01); *G06T 7/0097* (2013.01); *G06T 2207/10028* (2013.01); *G06T 2207/20144* (2013.01)

(58) Field of Classification Search
 CPC ... G06T 7/0081; G06T 7/2006; G06T 7/2053; G06T 7/0051; G06T 7/408; G06T 2207/10024; G06T 2207/20144; G06T 2207/10016; G06T 2207/10028; G06T 2207/30196; G06T 7/0079; G06T 7/2086; H04N 5/144
 See application file for complete search history.

(56) References Cited

U.S. PATENT DOCUMENTS 8,848,980 B2  9/2014  Du et al.
8,983,136 B2  3/2015  Liu et al.
(Continued)

OTHER PUBLICATIONS

Crabb, Ryan, et al. "Real-time foreground segmentation via range and color imaging." Computer Vision and Pattern Recognition Workshops, 2008. CVPRW'08. IEEE Computer Society Conference on. IEEE, 2008.*

(Continued)

*Primary Examiner* — Li Liu
(74) *Attorney, Agent, or Firm* — Harness, Dickey & Pierce, P.L.C.

(57) ABSTRACT

A method and an apparatus for separating a foreground image are disclosed. The method includes obtaining an input image and depth information of the input image; roughly dividing the input image to obtain a rough foreground region based on the depth information of the input image; obtaining motion information of the input image, and generating a three-color image from the rough foreground region based on the motion information; and separating the foreground image from the generated three-color image. According to the method, the three-color image is generated based on the depth information and the motion information, thus a foreground object can be accurately separated from the three-color image.

11 Claims, 5 Drawing Sheets

(56) References Cited

U.S. PATENT DOCUMENTS

| | | | | |
|---|---|---|---|---|
| 2008/0181507 A1* | 7/2008 | Gope | ............... | H04N 5/144 |
| | | | | 382/190 |
| 2011/0211754 A1* | 9/2011 | Litvak | ............... | G06K 9/00375 |
| | | | | 382/165 |
| 2011/0249190 A1* | 10/2011 | Nguyen | ............... | H04N 5/272 |
| | | | | 348/708 |
| 2012/0127267 A1* | 5/2012 | Zhang | ............... | G06T 7/0071 |
| | | | | 348/43 |
| 2014/0072212 A1* | 3/2014 | Sorgi | ............... | G06T 7/0081 |
| | | | | 382/164 |
| 2015/0055828 A1 | 2/2015 | Zhao et al. | | |
| 2015/0104067 A1 | 4/2015 | Liu | | |
| 2015/0243038 A1 | 8/2015 | Zhao | | |
| 2015/0269739 A1* | 9/2015 | Ho | ............... | G06T 7/408 |
| | | | | 382/164 |
| 2016/0012297 A1* | 1/2016 | Kanga | ............... | G06T 7/0051 |
| | | | | 382/103 |

OTHER PUBLICATIONS

Lu, Ting, and Shutao Li. "Image matting with color and depth information." Pattern Recognition (ICPR), 2012 21st International Conference on. IEEE, 2012.*

Min Li et al., "Rapid and Robust Human Detection and Tracking Based on Omega-Shape Features", National Laboratory of Pattern Recognition, Institute of Automation, Chinese Academy of Sciences, ICIP 2009, pp. 2545-2548.

* cited by examiner

MOTION INFORMATION CALCULATION

MOTION INFORMATION

ROUGHLY-DIVISION RESULT

THREE-COLOR IMAGE GENERATION

THREE-COLOR IMAGE

METHOD AND APPARATUS FOR SEPARATING FOREGROUND IMAGE, AND COMPUTER-READABLE RECORDING MEDIUM

BACKGROUND OF THE INVENTION

1. Field of the Invention

The present invention generally relates to the field of computer vision, and specifically, a method and an apparatus for separating a foreground image from an image.

2. Description of the Related Art

The technology of foreground image separation, i.e., the technology of image cut-out means separating a foreground object from an image or a video frame and estimating the transparency, i.e., α value (α masking) of each pixel in a region covered by the foreground object.

Such technology is widely applied in image or video editing applications. A user can separate foreground by this technology and combine the foreground with another background. As an example, in virtual photographing, the foreground such as a person can be combined with the virtual background to obtain an immersive experience, and for example, a conference participant can be separated from the original background in a video conference and be combined with another background.

In the current image cut-out process, a three-color image is usually used. From the viewpoint of image composition, an image I(x,y) may be modeled as a linear combination of a foreground image F(x,y), a background image B(x,y) and a value α(x,y), namely the equation I=αF+(1−α)B, where α(x,y) ϵ[0,1]. In order to solve this problem, an input image is usually divided into three regions, i.e., foreground region, background region and unknown region, and it is also referred to as a three-color image. The forming of the three-color image is the basis of a subsequent separation process, and a more accurate three-color image helps to separate a foreground object from an image or a video more accurately.

In the current methods for forming a three-color image, one method is to specify a three-color image in an image by a user in a user-interaction way, and for example, to draw some line segments in an image to specify which part is the foreground and which part is the background in the image. In this method, it is necessary for the user to generate the three-color image manually, thus it takes user's labor and the generated three-color image is not accurate enough. Another method is to introduce depth information to help to automatically generate a three-color image. In this method, user interaction is not required, however an object in the background which is close to a foreground object may still be included in a foreground region.

Furthermore, when calculating an α value based on a three-color image after the three-color image is obtained, the calculation is usually performed using only color information of the image. However, when the color of a foreground object in the image is close to the color of a background part, it is difficult to distinguish these two relying on only the color information, particularly, in a boundary region; thus it is difficult to obtain an accurate separation result.

SUMMARY OF THE INVENTION

In view of the above problems, the present invention has an object to provide a method and an apparatus that can accurately separate a foreground image from an image.

According to an aspect of the present invention, a method for separating a foreground image may include: obtaining an input image and depth information of the input image; roughly dividing, based on the depth information of the input image, the input image to obtain a rough foreground region; obtaining motion information of the input image, and generating a three-color image from the rough foreground region based on the motion information; and separating the foreground image from the generated three-color image.

In an alternative embodiment, generating the three-color image from the rough foreground region based on the motion information may include: obtaining images of m continuous frames immediately before the input image and calculating the motion information of each pixel from the images of the m continuous frames; and generating the three-color image from the rough foreground region based on the motion information of each pixel. Here it is determined that a pixel belongs to a background region, if the motion information of the pixel is less than a predetermined threshold; it is determined that a pixel belongs to an unknown region, if the motion information of the pixel is greater than or equal to the predetermined threshold and there is a pixel that does not belong to the rough foreground region in an adjacent region of the pixel; and it is determined that a pixel belongs to a foreground region, if the motion information of the pixel is greater than or equal to the predetermined threshold and all pixels in an adjacent region of the pixel belong to the rough foreground region.

In an alternative embodiment, separating the foreground image from the generated three-color image may include: calculating color information, depth gradient information and depth change information of each pixel in the unknown region; determining, based on color information, depth gradient information and depth change information of the pixel, whether the pixel belongs to the foreground region; and acquiring, based on a determination result, the foreground image.

In an alternative embodiment, determining whether the pixel belongs to the foreground region may include: constructing a cost function of an α value for separating the foreground image; and for each pixel in the unknown region, minimizing the cost function, and calculating the α value of the pixel by using the color information, the depth gradient information and the depth change information of the pixel, wherein it is determined that the pixel belongs to the foreground region when the α value of the pixel is greater than or equal to a predetermined threshold, and it is determined that the pixel does not belong to the foreground region when the α value of the pixel is less than the predetermined threshold.

In an alternative embodiment, the method for separating a foreground image may further include: for each pixel in the unknown region, calculating a normalized weight of the color information, the depth gradient information and the depth change information of the pixel in an adjacent region of n×n pixels, wherein calculating the α value of the pixel by using the color information, the depth gradient information and the depth change information of the pixel includes calculating the α value of the pixel by using a weighted value of the color information, a weighted value of the depth gradient information and a weighted value of the depth change information of the pixel.

In an alternative embodiment, roughly dividing the input image to obtain the rough foreground region based on the depth information of the input image may include: detecting, based on the depth information of the input image, a head-and-shoulders part of a person as the rough foreground region from the input image according to an Ω-shape feature; and for each pixel other than the head-and-shoulders part in the input image, determining whether the pixel belongs to the rough foreground region by comparing depth value of the pixel and depth value of the detected head-and-shoulders part, wherein it is determined that the pixel belongs to the rough foreground region when difference between the depth value of the pixel and the depth value of the head-and-shoulders part is less than or equal to a predetermined threshold, and it is determined that the pixel does not belong to the rough foreground region when the difference between the depth value of the pixel and the depth value of the head-and-shoulders part is greater than the predetermined threshold.

According to another aspect of the present invention, an apparatus for separating a foreground image may include: an obtainment unit configured to obtain an input image and depth information of the input image; a rough-division unit configured to roughly divide, based on the depth information of the input image, the input image to obtain a rough foreground region; a three-color image generation unit configured to generate a three-color image from the rough foreground region based on motion information of the input image; and a foreground image separation unit configured to separate the foreground image from the generated three-color image.

In an alternative embodiment, the three-color image generation unit may include: a first calculation unit configured to obtain images of m continuous frames immediately before the input image and calculate the motion information of each pixel from the images of the m continuous frames; and a generation unit configured to generate the three-color image from the rough foreground region based on the motion information of each pixel calculated by the first calculation unit, wherein the generation unit determines that a pixel belongs to a background region, if the motion information of the pixel is less than a predetermined threshold, the generation unit determines that a pixel belongs to an unknown region, if the motion information of the pixel is greater than or equal to the predetermined threshold and there is a pixel that does not belong to the rough foreground region in an adjacent region of the pixel, and the generation unit determines that a pixel belongs to a foreground region, if the motion information of the pixel is greater than or equal to the predetermined threshold and all pixels in an adjacent region of the pixel belong to the rough foreground region.

In an alternative embodiment, the foreground image separation unit may include: a second calculation unit configured to calculate color information, depth gradient information and depth change information of each pixel in the unknown region; a determination unit configured to determine, based on color information, depth gradient information and depth change information of the pixel calculated by the second calculation unit, whether the pixel belongs to the foreground region; and an acquiring unit configured to acquire, based on a determination result of the determination unit, the foreground image.

According to the present invention, a three-color image is automatically generated based on depth information and motion information of an input image, thus the three-color image can be accurately generated without human-computer interaction, accordingly a foreground image can be accurately separated from the three-color image. Furthermore, besides color information, depth gradient information in spatial domain and depth change information in time domain is also considered in the separation, thus a foreground object can be accurately separated even though the color of the foreground object is close to the color of the background.

DETAILED DESCRIPTION OF THE PREFERRED EMBODIMENTS

In the following, embodiments of the present invention are described in detail with reference to the accompanying drawings, so as to facilitate the understanding of the present invention.

Figure 1:
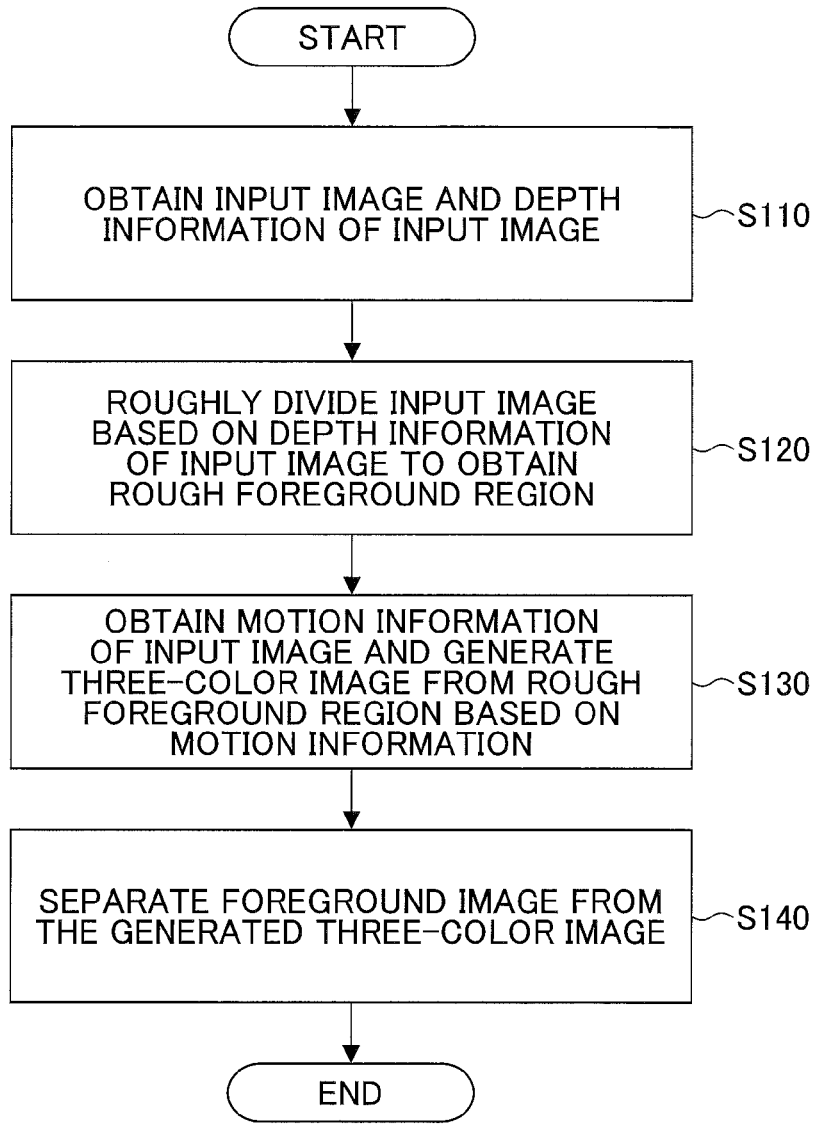
FIG. 1 is a flowchart illustrating a method for separating a foreground image according to an embodiment of the present invention.

FIG. 1 is a flowchart illustrating a method for separating a foreground image according to an embodiment of the present invention.

As illustrated in FIG. 1, the method for separating the foreground image may include: step S110, obtaining an input image and depth information of the input image; step S120, roughly dividing, based on the depth information of the input image, the input image to obtain a rough foreground region; step S130, obtaining motion information of the input image, and generating a three-color image from the rough foreground region based on the motion information; and step S140, separating the foreground image from the generated three-color image.

The input image obtained in step S110 may include a color image as an object where a cut-out process is performed, and a depth image corresponding to the color image. There is a photographing apparatus that can capture both of color information and depth information of a scene in the prior art, such as a PrimeSense camera, a Kinect or other depth camera. Accordingly, the color information and the depth information of the input image can be obtained at the same time. It should be noted that, any method that color information and depth information of an image can be obtained in the art may be applied to the present invention, and the obtainment method of the present invention is not limited, as long as color information and depth information can be obtained.

In step S120, the input image is roughly divided based on the depth information of the input image, and a rough foreground region is obtained. In the following, as an example of a foreground object, the separation of the foreground object will be described for a "person", however the foreground object of the present invention is not limited to a person.

Figure 2:
FIG. 2 is a schematic drawing illustrating head-and-shoulders models of a person in different scenes.

FIG. 2 is a schematic drawing illustrating head-and-shoulders models of a person in different scenes. As illustrated in FIG. 2, at different viewing angles, for a head-and-shoulder part (head and shoulders) of a person, a unique feature similar to an Ω-shape (omega shape) appears. Accordingly, a person may be detected by using this feature. Detection of a head-and-shoulders part with a Ω-shape may be performed in a depth image, by using a Viola-Jones classifier and an AdaBoost classifier based on a HOG feature (specifically, see "RAPID AND ROBUST HUMAN DETECTION AND TRACKING BASED ON OMEGA-SHAPE FEATURES" by Min Li et al., National Laboratory of Pattern Recognition, Institute of Automation, Chinese Academy of Sciences, the contents of which are hereby incorporated by reference).

It may be preliminary determined whether a pixel belongs to the foreground or the background based on the detection result of the head-and-shoulders part, accordingly a rough separation result of the foreground region is generated. This process may include: for each pixel in the input image, determining the relationship between depth information, distance information in the spatial domain between the pixel and a head-and-shoulders region, and thresholds thereof, to determine whether the pixel belongs to a "person" region or not. For example, the detected head-and-shoulders region may be assumed to be a foreground region, and for each pixel other than the head-and-shoulders region, it may be determining whether the pixel belongs to the foreground region by comparing depth value of the pixel and depth value of the detected head-and-shoulders region. Specifically, it may be determined that the pixel belongs to the foreground region, if the depth value of the pixel and the average depth value of the head-and-shoulders region are continuous (for example, the difference between the depth value of the pixel and the average depth value of the head-and-shoulders region is less than or equal to a predetermined threshold); and it may be determined that the pixel does not belong to the foreground region, if there is a clear difference between the depth value of the pixel and the average depth value of the head-and-shoulders region (for example, the difference between the depth value of the pixel and the average depth value of the head-and-shoulders region is greater than the predetermined threshold). As a result, a rough foreground region is separated.

It should be noted that, in the method for roughly detecting the rough foreground region based on the depth information, as the foreground object, a person is described above; however, the foreground object in the present invention is not limited to a person. For any other object, such as an animal or an object, if a corresponding shape feature or any other feature that can be used in the detection is previously obtained or stored, the detection may also be performed based on the depth information according to these features.

Figure 3:
FIG. 3 is a schematic drawing illustrating a scene and a corresponding division result of a rough foreground.

Usually, the foreground and the background can be separated by step S120; however, when the foreground is very close to an object in a scene, the result of this method is not satisfactory. For example, FIG. 3 is a schematic drawing illustrating a scene and a corresponding division result of a rough foreground. As illustrated in the left drawing of FIG. 3, a person is very close to a chair in the scene, and the depth values of these two are continuous. At this time, it is difficult to accurately separate the foreground from the scene by using only the depth information in an image of a single frame. As illustrated by a rough separation result in the right drawing of FIG. 3, the gray region represents the rough foreground region.

Accordingly, in step S130, motion information of the input image is obtained, and the three-color image is generated based on the motion information. Specifically, images of m continuous frames immediately before the input image (the current frame and m−1 continuous frames immediately before the current frame) may be obtained, and the motion information of each pixel may be calculated for each frame. Here, the calculation may be performed for any one of color image and depth image of the input image.

In a specific example, optical flow information of the image may be calculated as the motion information. The optical flow is a concept in object motion detection in the visible region, and is used to describe a movement of an observation target, surface or edge with respect to a movement of an observer. Optical flow method actually is a method for estimating a moving speed and direction of an object by detecting a change with time of intensity of a pixel of an image. Usually, the luminance of a pixel at (x,y,t) is assumed to be I(x,y,t), according to the assumption that the luminances of the same pixel in two adjacent image frames are approximately equal to each other, the following formula (1) can be derived based on Taylor series.

$$I_x \cdot V_x + I_y \cdot V_y + I_t = 0 \tag{1}$$

Where $V_x$ and $V_y$ are the velocities in x and y directions, i.e., the optical flow of I(x,y,t) respectively. The optical flow information can be calculated by using a conventional method such as phase correlation, block correlation, gradient constraint or the like. Since the specific process of derivation and calculation is not the focus of the present invention, the description is omitted here.

It is known that, if a pixel does not move in continuous image frames, the velocity, i.e., the optical flow information is 0. Accordingly, pixels of the background usually are stationary, thus the optical flow information of the background pixels usually is a value close to 0 or a relatively small value (considering the influence of noise). On the other hand, an object of the foreground usually moves slightly in a plurality of continuous image frames, thus the optical information of foreground pixels can be obtained by the above optical flow method.

Figure 4:
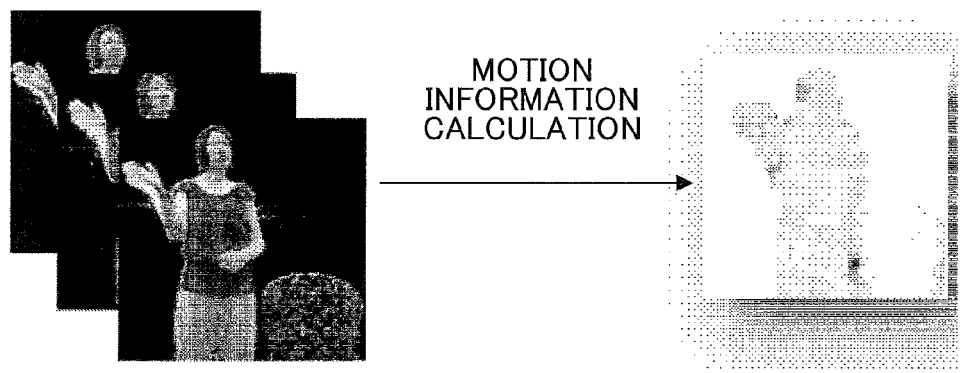
FIG. 4 is a schematic drawing illustrating input images and corresponding optical flow information.

FIG. 4 is a schematic drawing illustrating input images of three continuous frames and corresponding optical flow information. In FIG. 4, the distance between a person and a chair in a scene is very short and it is very difficult to distinguish those two by the rough foreground separation; however, as illustrated in the drawing of the obtained optical flow information, there is clear optical flow information in the person region, especially the edge of the person, and the optical flow information in the chair region is very weak. Thus, the chair that does not belong to the foreground can be further removed from the rough foreground region based on the optical flow information.

It should be noted that, the above optical flow information is just an specific example of the motion information, and the present invention may use any information that can reflect motion as the motion information to generate the three-color image.

Specifically, generating the three-color image from the rough foreground separation result based on the motion information of each pixel in the input image may include: determining that a pixel belongs to a background region, if the motion information of the pixel is less than a predetermined threshold; determining that a pixel belongs to an unknown region, if the motion information of the pixel is greater than or equal to the predetermined threshold and there is a pixel that does not belong to the rough foreground region in an adjacent region of the pixel; and determining that a pixel belongs to a foreground region, if the motion information of the pixel is greater than or equal to the predetermined threshold and all pixels in an adjacent region of the pixel belong to the rough foreground region.

The predetermined threshold of the motion information may be set by a person skilled in the art based on experience or specific applications.

Figure 5:
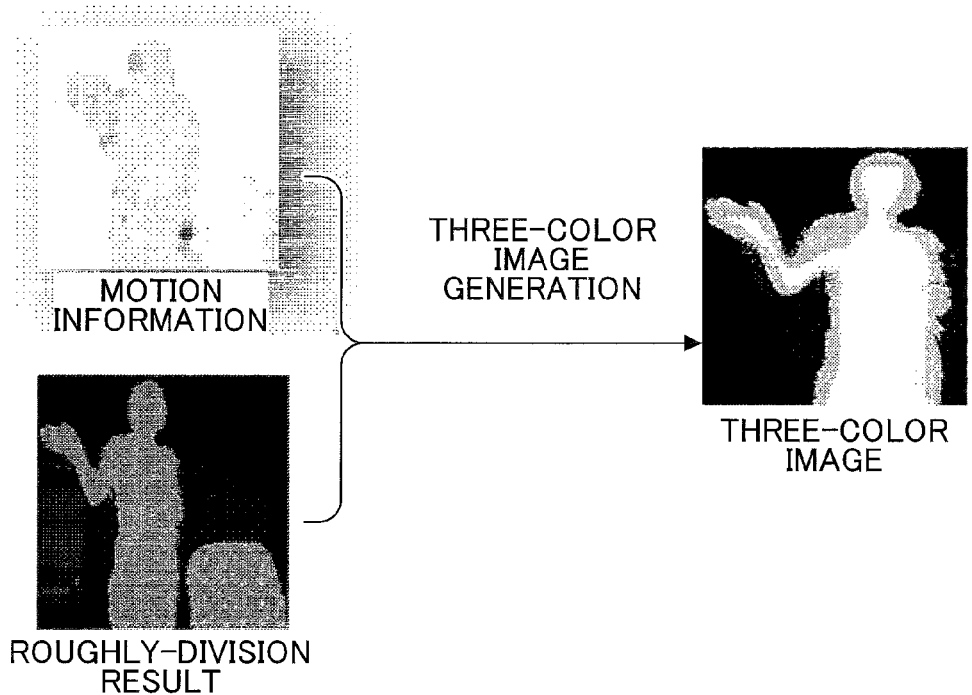
FIG. 5 is a schematic drawing illustrating a process of generating a three-color image based on the division result of the rough foreground according to motion information in the case of FIG. 4.

FIG. 5 is a schematic drawing illustrating a process of generating a three-color image based on the division result of the rough foreground according to motion information in the case of FIG. 4, where the white region represents the foreground region, the black region represents the background region and the gray region represents the unknown region.

Thus, in step S130, the object in the rough foreground region that does not belong to the foreground, such as the chair in the above example, can be further removed. Accordingly, a more accurate three-color image for a subsequent cut-out process can be obtained.

After the three-color image is generated in step S130, in step S140, the foreground image is separated from the generated three-color image.

As described above, a pixel i in the image can be represented as $I_i = \alpha_i F_i + (1-\alpha_i) B_i$. Therefore, for a pixel in the unknown region in the above generated three-color image, it is possible to determine whether the pixel belongs to the foreground region, by calculating the $\alpha$ value of the pixel.

In order to calculate the $\alpha$ value of the pixel in the unknown region, usually, the calculation may be performed by constructing a cost function. The above image cut-out problem $I_i = \alpha_i F_i + (1-\alpha_i) B_i$ is rewritten to the following formula (2).

$$\alpha_i = a^T I_i + b, \; i \in w, \quad (2)$$

Where $a = 1/(F-B)$, and $b = -B/(F-B)$.

This problem is constructed as a optimization problem, and the following cost function (3) can be obtained.

$$J(\alpha, a, b) = \sum_j \sum_{i \in w_j} (a_j^T I_i + b_j - \alpha_i)^2 + \epsilon a_j^T a_j \quad (3)$$

Where $\epsilon a_j^T a_j$ controls the degree of smoothness, and for example, may control an interval or a number of the iterative, $I_i$ is a vector of the pixel I in a RGB color space, namely, $I_i = [R_i, G_i, B_i]$ at this time.

In order to obtain the solution of the above optimization problem, the cost function (3) is minimized, and the $\alpha$ value can be calculated by using the color information $I_i = [R_i, G_i, B_i]$ of the pixel i. It can be determined whether the pixel i belongs to the foreground region, based on the calculated $\alpha$ value.

For example, a predetermined threshold T of the $\alpha$ value may be set. The $\alpha$ may be set to $\alpha=1$, namely, it is determined that the pixel belongs to the foreground region, when the calculated $\alpha$ value is greater than or equal to the threshold T; and the $\alpha$ may be set to $\alpha=0$, namely, it is determined that the pixel does not belong to the foreground region but belongs to the background region, when the calculated $\alpha$ value is less than the threshold T. The predetermined threshold T may be set by a person skilled in the art based on experience or specific applications.

Thus, according to the method for separating the foreground image of the present embodiment, the input image can be roughly divided based on the depth information, the three-color image can be accurately generated from the rough separation result based on the motion information of the input image, and the foreground image can be accurately separated from the three-color image.

The separated foreground image may be output to a display apparatus for displaying, or be output to a processing apparatus to perform further processing, such as composite processing or the like.

In the above embodiment, the transparency a is calculated by using the color information of the pixel. However, in some cases, it is very difficult to properly separate the foreground from the background, especially in a boundary region, when the color of a foreground object is close to the color of the background.

Therefore, in another embodiment of the present invention, a method for separating a foreground image from a three-color image based on color information and depth information is provided. In this method, depth information in the spatial domain and the time domain is introduced into the above cost function (3) to calculate the $\alpha$ value.

Figure 6:
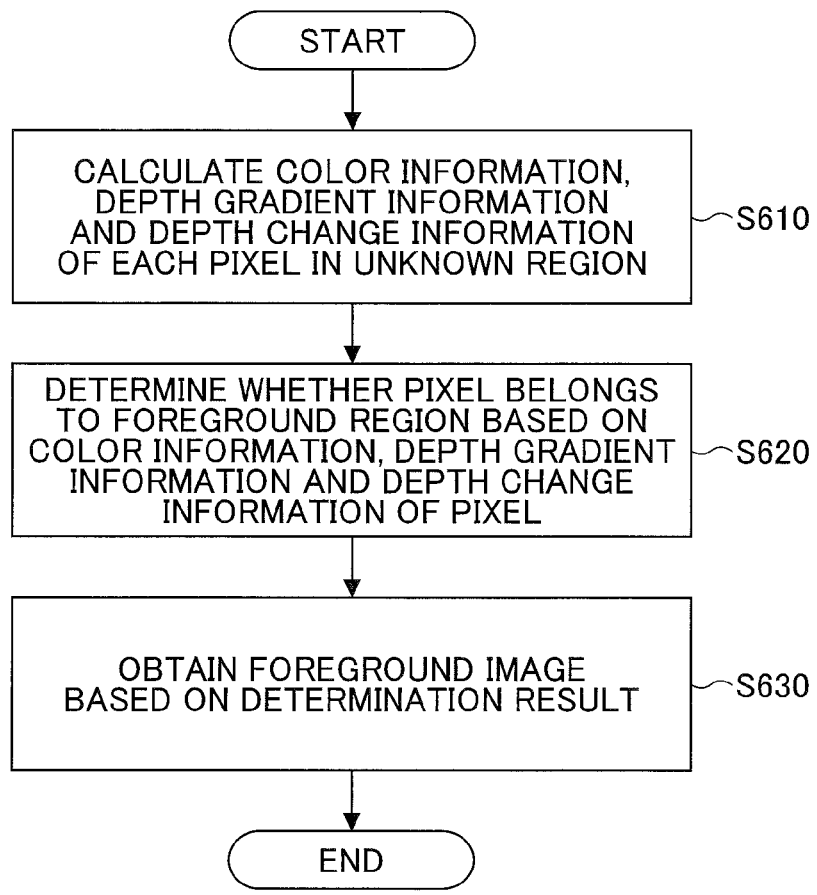
FIG. 6 is a flowchart illustrating a method for separating a foreground image from a three-color image according to an embodiment of the present invention.

FIG. 6 is a flowchart illustrating a method for separating a foreground image from a three-color image according to an embodiment of the present invention. As illustrated in FIG. 6, the method for separating the foreground image includes: step S610, calculating color information, depth gradient information and depth change information of each pixel in the unknown region; step S620, determining, based on color information, depth gradient information and depth change information of the pixel, whether the pixel belongs to the foreground region; and step S630, acquiring, based on a determination result, the foreground image.

In step S610, besides obtaining the RGB color information of the pixel in the unknown region, the depth gradient information and the depth change information of the pixel is calculated.

Figure 7:
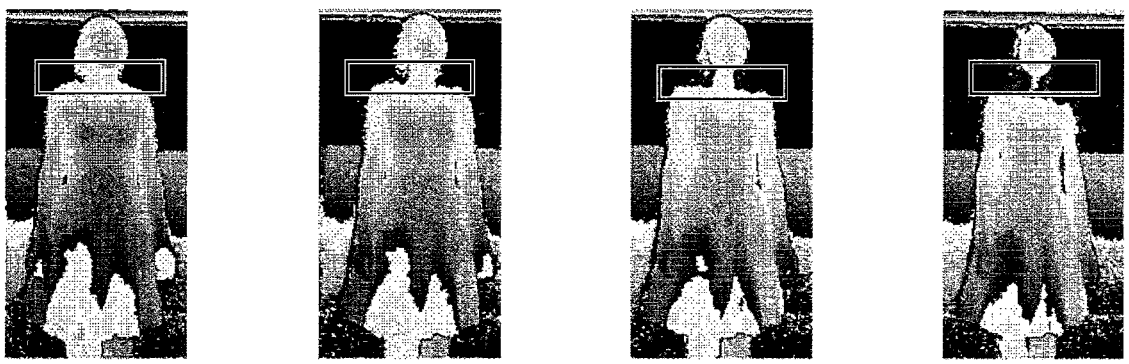
FIG. 7 is a schematic drawing illustrating an example of depth change information of a person in a plurality of continuous frames of images, which is a foreground object.

FIG. 7 is a schematic drawing illustrating an example of depth change information of a person in a plurality of continuous frames of images, which is a foreground object. As illustrated in FIG. 7, in most cases, the depth change of a foreground object at a boundary may be more severe than a region inside the foreground object. Accordingly, for a pixel i in the unknown region, the change of depth value in the input image of m continuous frames may be calculated in the time domain, as depth change information $DC_i$, and the depth change information $DC_i$ may be expressed as the following formula (4).

$$DC_i = \sum_{k=1}^{m} |D_{k_i} - D_{(k-1)_i}| \quad (4)$$

Where $D_{ki}$ represents the depth value of pixel i in k-th frame image. Accordingly, the foreground can be separated from the background more properly by using the depth change information. At this time, $I_i$ in the above cost function (3) may be expressed as $I_i = [R_i, G_i, B_i, DC_i]$, so that α value is calculated based on the color information and the depth change information of the pixel i.

For example, in the generated three-color image illustrated in FIG. 5, the boundary region of the head-and-shoulders part of the person is determined as the unknown region; however, as illustrated in FIG. 7, in the input depth images of continuous frames, the change of the depth values of pixels of the head-and-shoulders part (illustrated by the rectangular box in FIG. 7) of the person is more clear than the change of the depth values of pixels inside of the person (such as a body part). Thus, it can be determined whether the pixel belongs to the foreground object, i.e., the person, by using the depth change information of the pixel in the region.

Figure 8:
FIG. 8 is a schematic drawing illustrating an example of depth gradient information calculated for a person.

Additionally, the depth gradient information may also be calculated in the spatial domain, and for example, the depth gradient information $DG_i$ of pixel i in the unknown region may be calculated, by using a Sobel operator, a Canny operator or other boundary detection operator for the input depth image. FIG. 8 is a schematic drawing illustrating an example of depth gradient information calculated for a person.

In this case, $I_i$ in the above cost function (3) may be expressed as $I_i=[R_i, G_i, B_i, DG_i]$, to calculate α value based on the color information and the depth gradient information of pixel i. Alternatively, $I_i$ in the above cost function (3) may be expressed as $I_i=[R_i, G_i, B_i, DC_i, DG_i]$, to calculate α value based on the color information, the depth change information and the depth gradient information of pixel i.

Thus, according to the above method, besides the color information, the depth gradient information and the depth change information of the pixel is further calculated in the spatial domain and the time domain, and they are introduced into the cost function to calculate the α value, so that it is determined whether the pixel belongs to the foreground region, and the foreground image is separated.

Furthermore, in different cases, the color information and the depth information have different discriminabilities, the color information has a relatively high discriminability in some cases, and the depth information has a relatively high discriminability to properly separate the foreground from the background. Accordingly, in another embodiment of the present invention, a weight of each of the above components (the RGB color information, the depth gradient information and the depth change information) may be adaptively calculated.

For example, for each pixel in the unknown region of the above generated three-color image, the weight of each component may be calculated in an adjacent region of n×n (for example 3×3) pixels by the following formula (5).

$$w_{l_i} = \frac{\sum_{j=1}^{n^2}(l_j - \bar{l})^2}{n \times n} \quad (5)$$

Where $w_{l_i}$ is the weight of component 1 (the RGB color information, the depth gradient information and the depth change information) of pixel i, 1 ∈(R, G, B, DC, DG), $l_j$ represents component 1 of each pixel j in adjacent region of n×n pixels.

Next, normalization of the weight of the color information, the depth gradient information and the depth change information may be performed according to the following formula (6).

$$w_{ln_i} = \frac{w_{li}}{\sum_{k \in (r,g,b,dc,dg)} w_{ki}} \quad (6)$$

Where $w_{ln_i}$ represents the normalized weight.

Thus, pixel $I_i$ in the above cost function (3) may be expressed as $I_i=[w_{rni}R_i, w_{gni}G_i, w_{bni}B_i, w_{dgni}DG_i, w_{dcni}DC_i]$, α value is calculated by minimizing the cost function, and the foreground can be accurately separated from the image.

In the method for separating a foreground image according to the embodiments of the present invention, a three-color image is automatically generated based on depth information and motion information of an input image, thus the three-color image can be accurately generated without a human-computer interaction; accordingly a foreground image can be accurately separated from the three-color image. Furthermore, besides color information, depth gradient information in spatial domain and depth change information in time domain are also considered in the separation, thus a foreground object can be accurately separated even though the color of the foreground object is close to the color of the background.

Figure 9:
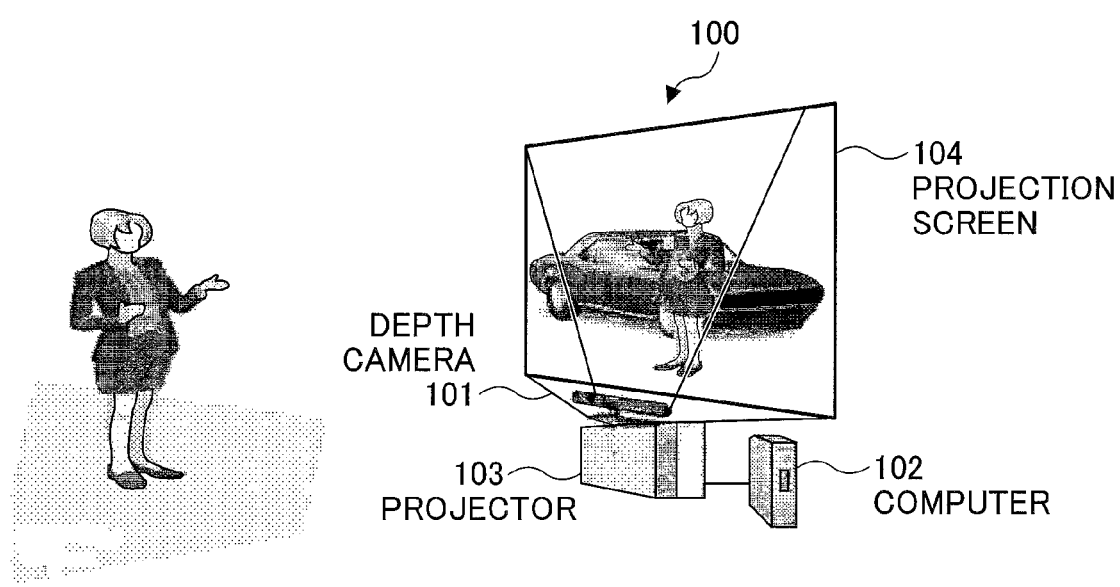
FIG. 9 is a schematic drawing illustrating a possible application scene of the method for separating the foreground image of the present invention.

As an example, FIG. 9 illustrates a possible application scene of the method for separating the foreground image of the present invention. Application system 100 may include a depth camera 101, a computer 102, a projector 103, and a projection screen 104. The depth camera 101 may be a camera that can capture both color information and depth information at the same time. The computer 102 may receive an image or a video frame of a scene captured by the depth camera 101 and corresponding color information and depth information, and may analyze the information captured by the depth camera 101 by a processor and execute the foreground image separation method to separate a foreground object from a scene. The separated foreground object may be combined with another background to be used in different application scenes. The projector 103 and the projection screen 104 may display the combined image or scene. It should be noted that, the projector 101 and the projection screen 104 are just an example of a display apparatus, and may be replaced by another display apparatus, such as a television screen or the like. It should be noted that, the system 100 described here is just an example; the present invention is not limited to this, and the configuration of the system 100 may be changed or adjusted based on specific applications.

Figure 10:
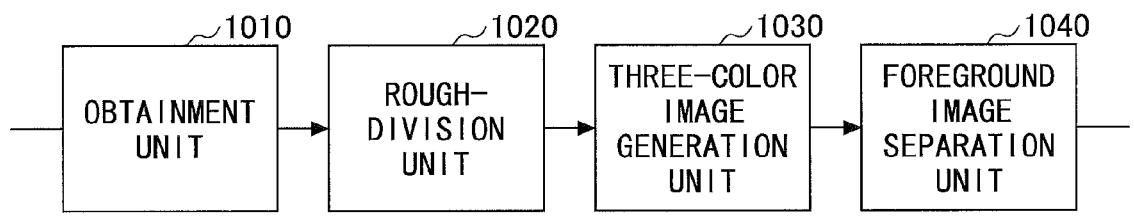
FIG. 10 is a functional block diagram illustrating an apparatus for separating a foreground image according to an embodiment of the present invention.

According to another embodiment of the present invention, an apparatus for separating a foreground image is provided. FIG. 10 is a functional block diagram illustrating an apparatus for separating a foreground image according to an embodiment of the present invention.

As illustrated in FIG. 10, the apparatus for separating a foreground image (foreground image separation apparatus) 1000 may include: an obtainment unit 1010 configured to obtain an input image and depth information of the input image; a rough-division unit 1020 configured to roughly divide, based on the depth information of the input image, the input image to obtain a rough foreground region; a three-color image generation unit 1030 configured to generate a three-color image from the rough foreground region based on motion information of the input image; and a foreground image separation unit 1040 configured to separate the foreground image from the generated three-color image.

In an alternative embodiment, the three-color image generation unit may include: a first calculation unit (not shown) configured to obtain images of m continuous frames immediately before the input image and calculate the motion information of each pixel from the images of the m continuous frames; and a generation unit (not shown) configured to generate the three-color image from the rough foreground region based on the motion information of each pixel calculated by the first calculation unit.

The generation unit determines that a pixel belongs to a background region, if the motion information of the pixel is less than a predetermined threshold; the generation unit determines that a pixel belongs to an unknown region, if the motion information of the pixel is greater than or equal to the predetermined threshold and there is a pixel that does not belong to the rough foreground region in an adjacent region of the pixel; and the generation unit determines that a pixel belongs to a foreground region, if the motion information of the pixel is greater than or equal to the predetermined threshold and all pixels in an adjacent region of the pixel belong to the rough foreground region.

In another alternative embodiment, the foreground image separation unit may include: a second calculation unit (not shown) configured to calculate color information, depth gradient information and depth change information of each pixel in the unknown region; a determination unit (not shown) configured to determine, based on color information, depth gradient information and depth change information of the pixel calculated by the second calculation unit, whether the pixel belongs to the foreground region; and an acquiring unit (not shown) configured to acquire, based on a determination result of the determination unit, the foreground image.

In another alternative embodiment, the determination unit may: construct a cost function of an α value for separating the foreground image; and for each pixel in the unknown region, minimize the cost function, and calculate the α value of the pixel by using the color information, the depth gradient information and the depth change information of the pixel. It is determined that the pixel belongs to the foreground region when the α value of the pixel is greater than or equal to a predetermined threshold, and it is determined that the pixel does not belong to the foreground region when the α value of the pixel is less than the predetermined threshold.

In another alternative embodiment, for each pixel in the unknown region, the determination unit may calculate a normalized weight of the color information, the depth gradient information and the depth change information of the pixel in an adjacent region of n×n pixels; and may calculate the α value of the pixel by using a weighted value of the color information, a weighted value of the depth gradient information and a weighted value of the depth change information of the pixel.

The operation of each unit of the foreground image separation apparatus 1000 illustrated in FIG. 10 may refer to the description of the flowchart illustrated in FIG. 1, and the detailed description is omitted here. According to the foreground image separation apparatus, a three-color image is automatically generated based on depth information and motion information of an input image, and thus the three-color image can be accurately generated without human-computer interaction; accordingly a foreground image can be accurately separated from the three-color image. Furthermore, besides color information, depth gradient information in spatial domain and depth change information in time domain are also considered in the separation, thus a foreground object can be accurately separated even though the color of the foreground object is close to the color of the background.

Figure 11:
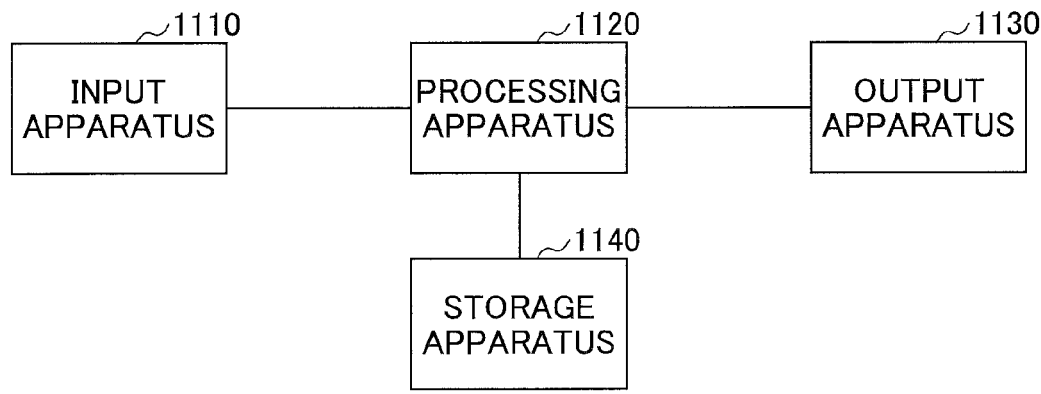
FIG. 11 is a schematic drawing illustrating the hardware configuration of a system for separating a foreground image according to an embodiment of the present invention.

Next, FIG. 11 illustrates the hardware configuration of a system for separating a foreground image according to an embodiment of the present invention. As illustrated in FIG. 11, the system 1100 includes: an input apparatus 1110 for inputting images to be processed from the outside, such as the above color image and grayscale image, and information to be processed, such as depth information, for example, including a keyboard, a mouse, a communication network and a remote input device connected thereto, etc.; a processing apparatus 1120 for implementing the above method for separating a foreground image according to the embodiments of the present invention or the above apparatus for separating a foreground image according to the embodiments of the present invention, such as CPU of a computer or other chips having processing ability, etc., which are connected to a network such as the Internet (not shown) to obtain data such as a disparity map from the network in the process; an output apparatus 1130 for outputting the result of the foreground image separation, such as the separated foreground image and a combination result of the foreground image, such as a screen, a printer, a communication network and a remote output device connected thereto, etc.; and a storage apparatus 1140 for storing images, data, the obtained results, commands and intermediate data or the like related to the above shielding detection process, by a volatile method or a nonvolatile method, such as various kinds of volatile or nonvolatile memory including a random-access memory (RAM), a read-only memory (ROM), a hard disk and a semiconductor memory.

It should be noted that, for convenience, FIG. 11 only shows a part of the units of the system related to the present invention, and units such as a bus, input/output ports or the like are omitted. In addition, system 1200 may also include other suitable units based on a specific application condition.

The method, apparatus and system for separating a foreground image according to the embodiments of the present invention are described above in detail with reference to the accompany drawings. As an example of a foreground object, a person is described above; however, as known by a person skilled in the art, the object of the present invention is not limited to a person, and may be any other animals or objects.

The block diagrams of the units, apparatuses, devices and system are just examples; the connection, placement and configuration illustrated in the block diagrams related to the present invention are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not. The term "such as" means and may be changed to "such as, but not limited to".

The flowchart and the method according to the present invention are just examples, and not limited to the steps in the embodiments. The steps of the embodiments may be performed in any order. The terms "next", "subsequently" and "then" are just for describing the present invention, and the present invention is not limited to these terms. Furthermore, the articles "a" and "an" should not be limited to the singular element.

The present invention is not limited to the specifically disclosed embodiments, and various modifications, combinations and replacements may be made without departing from the scope of the present invention.

The present application is based on and claims the benefit of priority of Chinese Priority Application No. 201410573559.3 filed on Oct. 23, 2014, the entire contents of which are hereby incorporated by reference.

What is claimed is:

1. A method for separating a foreground image, the method comprising:
   obtaining an input image and depth information of the input image;
   roughly dividing, based on the depth information of the input image, the input image to obtain a rough foreground region;
   obtaining motion information of the input image,
   generating a three-color image from the input image based on the rough foreground region and the motion information;
   first determining a relationship between the motion information of a plurality of pixels in the three-color image and a first threshold value;
   second determining whether all pixels in an adjacent region of each of the plurality of pixels belong to the rough foreground region; and
   separating the foreground image from the generated three-color image by identifying at least one first pixel of the plurality of pixels as part of the foreground image if the first determining determines that the motion information of the at least one first pixel is greater than or equal to the threshold and the second determining determines that all pixels in the adjacent region of the at least one first pixel belong to the rough foreground region.

2. The method for separating a foreground image according to claim 1, wherein the generating the three-color image from the rough foreground region based on the motion information includes:
   obtaining images of m continuous frames immediately before the input image and calculating the motion information of each pixel from the images of the m continuous frames;
   third determining that at least one second pixel of the plurality of pixels belongs to a background region if the first determining determines that the motion information of the at least one second pixel is less than the first threshold; and
   fourth determining that at least one third pixel of the plurality of pixels belongs to an unknown region, if the first determining determines that the motion information of the at least one third pixel is greater than or equal to the first threshold and the second determining determines that at least one in the adjacent region of the at least one third pixel does not belong to the rough foreground region.

3. The method for separating a foreground image according to claim 2, wherein the separating the foreground image from the generated three-color image includes:
   calculating color information, depth gradient information and depth change information of each of the at least one third pixel in the unknown region;
   determining, based on the corresponding color information, the corresponding depth gradient information and the corresponding depth change information, whether each of the at least one third pixel belongs to the foreground region; and
   acquiring, based on a determination result, the foreground image.

4. The method for separating a foreground image according to claim 3, wherein the separating the foreground region from the generated three-color image includes:
   constructing a cost function of an $\alpha$ value for separating the foreground image;
   for each of the at least one third pixel in the unknown region, minimizing the corresponding cost function, and calculating the $\alpha$ value of each of the at least one third pixel by using the corresponding color information, the corresponding depth gradient information and the corresponding depth change information; and
   determining that one or more of the at least one third pixel belongs to the foreground region when the $\alpha$ value the one or more of the at least one third pixel is greater than or equal to a second threshold, and
   determining that the one or more of the at least one third pixel does not belong to the foreground region when the $\alpha$ value the one or more of the at least one third pixel is less than the second threshold.

5. The method for separating a foreground image according to claim 4, further comprising:
   for each of the at least one third pixel in the unknown region, calculating a normalized weight of the color information, the depth gradient information and the depth change information of at least one pixel in a region of n×n pixels adjacent to each of the at least one third pixel,
   wherein the calculating calculates the $\alpha$ value by using a weighted value of the corresponding color information, a weighted value of the corresponding depth gradient information and a weighted value of the corresponding depth change information.

6. The method for separating a foreground image according to claim 1, wherein the roughly dividing the input image to obtain the rough foreground region based on the depth information of the input image includes:
   detecting, based on the depth information of the input image, a head-and-shoulders part of a person as the rough foreground region from the input image according to an $\Omega$-shape feature; and
   for each pixel other than the head-and-shoulders part in the input image, determining whether the pixel belongs to the rough foreground region by comparing depth value of the pixel and depth value of the detected head-and-shoulders part,
   determining the pixel belongs to the rough foreground region when a difference between the depth value of the pixel and the depth value of the head-and-shoulders part is less than or equal to a third threshold, and
   determining that the pixel does not belong to the rough foreground region when the difference between the depth value of the pixel and the depth value of the head-and-shoulders part is greater than the third threshold.

7. The method for separating a foreground image according to claim 1, wherein the motion information is optical flow information.

8. An apparatus for separating a foreground image, the apparatus comprising:
   a memory having computer-readable instructions stored therein; and
   a processor configured to execute the computer-readable instructions to
      obtain an input image and depth information of the input image, roughly divide, based on the depth information of the input image, the input image to obtain a rough foreground region, generate a three-color image from the input image based on the rough foreground region based and motion information of the input image, first determine a relationship between the motion information of a plurality of pixels in the three-color image and a first threshold value, second determine whether all pixels in an adjacent region of each of the plurality of pixels belong to the rough foreground region, and separate the foreground image from the generated three-color image by identifying at least one first pixel of the plurality of pixels as part of the foreground image if the first determining determines that the motion information of the at least one first pixel is greater than or equal to the threshold and the second determining determines that all pixels in the adjacent region of the at least one first pixel belong to the rough foreground region.

9. The apparatus for separating a foreground image according to claim 8, wherein the processor is configured to execute the computer-readable instructions to, generate the three-color image by obtaining images of m continuous frames immediately before the input image and calculating the motion information of each pixel from the images of the m continuous frames, third determine that at least one second pixel of the plurality of pixels belongs to a background region if the first determining determines that the motion information of the at least one second pixel is less than the first threshold; and fourth determine that at least one third pixel of the plurality of pixels belongs to an unknown region, if the first determining determines that the motion information of the at least one third pixel is greater than or equal to the first threshold and the second determining determines that at least one in the adjacent region of the at least one third pixel does not belong to the rough foreground region in an adjacent region of the pixel.

10. The apparatus for separating a foreground image according to claim 9, wherein the processor is configured to execute the computer-readable instructions to, calculate color information, depth gradient information and depth change information of each of the at least one third pixel in the unknown region, determine, based on the corresponding color information, the corresponding depth gradient information and the corresponding depth change information, whether each of the at least one third pixel belongs to the foreground region, and acquire, based on a determination result, the foreground image.

11. A non-transitory computer-readable recording medium having stored therein a program for causing a computer to execute a process for separating a foreground image by, obtaining an input image and depth information of the input image;

roughly dividing, based on the depth information of the input image, the input image to obtain a rough foreground region;

obtaining motion information of the input image, generating a three-color image from the input image based on the rough foreground region and the motion information;

first determining a relationship between the motion information of a plurality of pixels in the three-color image and a first threshold value;

second determining whether all pixels in an adjacent region of each of the plurality of pixels belong to the rough foreground region; and separating the foreground image from the generated three-color image by identifying at least one first pixel of the plurality of pixels as part of the foreground image if the first determining determines that the motion information of the at least one first pixel is greater than or equal to the threshold and the second determining determines that all pixels in the adjacent region of the at least one first pixel belong to the rough foreground region.

\* \* \* \* \*